United States Patent

Cavallo et al.

[11] Patent Number: 5,699,947
[45] Date of Patent: Dec. 23, 1997

[54] PROCESS AND MACHINE FOR PARTING THE CAP OF CONNECTING RODS, PARTICULARLY CONNECTING RODS FOR INTERNAL-COMBUSTION ENGINES

[75] Inventors: Giorgio Cavallo; Gian Luca Giovanelli; Marco Martinis, all of Turin, Italy

[73] Assignee: Vigel S.p.A., Borgaro Torinese, Italy

[21] Appl. No.: 541,361

[22] Filed: Oct. 10, 1995

[30] Foreign Application Priority Data

Oct. 18, 1994 [IT] Italy ................... TO94A0826

[51] Int. Cl.⁶ ............................................ B23P 17/02
[52] U.S. Cl. ....................... 225/101; 225/103; 29/888.09
[58] Field of Search ............................. 225/100, 101, 225/103, 104, 105; 227/147, 130; 29/888.09, 888.091, 888.092; 173/201

[56] References Cited

U.S. PATENT DOCUMENTS

| | | | |
|---|---|---|---|
| 4,754,906 | 7/1988 | Brovold | 225/103 X |
| 4,768,694 | 9/1988 | Fabris et al. | 225/100 X |
| 5,105,538 | 4/1992 | Hoag et al. | 29/888.09 X |
| 5,169,046 | 12/1992 | Miessen et al. | 225/100 X |
| 5,199,627 | 4/1993 | Christensen | 227/130 X |
| 5,263,622 | 11/1993 | Henzler et al. | 225/103 X |
| 5,320,265 | 6/1994 | Becker | 29/888.09 X |
| 5,353,500 | 10/1994 | Hoag et al. | 29/888.09 X |
| 5,503,317 | 4/1996 | Jones et al. | 225/100 X |
| 5,566,449 | 10/1996 | Okamoto et al. | 29/888.092 |

FOREIGN PATENT DOCUMENTS

| | | | |
|---|---|---|---|
| 0396797 | 11/1990 | European Pat. Off. | |
| 402088134 | 3/1990 | Japan | 29/888.09 |
| 405200633 | 8/1993 | Japan | 29/888.09 |

OTHER PUBLICATIONS

"Connecting Rods Are Cracked to Perfection", *Machine Design*, Mar. 10, 1988, pp. 66–67.

*Primary Examiner*—Rinaldi I. Rada
*Assistant Examiner*—Boyer Ashley
*Attorney, Agent, or Firm*—Guido Modiano; Albert Josif

[57] ABSTRACT

According to the invention, parting of the cap of the connecting rod is achieved by engaging the eye of the big end of the connecting rod with two semicylindrical fixtures, respectively a fixed fixture and a movable fixture, which are actuated by a hydraulic actuator which is interposed between them and is adapted to expand the fixtures in a diametrical direction against the inner surface of the eye of the big end of the connecting rod, subjecting the piston of the actuator to the action of a hydraulic fluid fed into the respective actuation cylinder at an optional pre-loading pressure that is in any case lower than the pressure required to reach the yield point of the material of the connecting rod, and producing an instantaneous peak in the pressure of the fluid fed to the hydraulic actuator by means of an auxiliary piston that is subjected to the momentary action of a striking mass.

9 Claims, 2 Drawing Sheets

PROCESS AND MACHINE FOR PARTING THE CAP OF CONNECTING RODS, PARTICULARLY CONNECTING RODS FOR INTERNAL-COMBUSTION ENGINES

BACKGROUND OF THE INVENTION

The present invention relates to a process and a machine for parting the cap of connecting rods, particularly connecting rods for internal-combustion engines.

It is known that connecting rods for internal-combustion engines comprise an elongated portion, or shank; one end is the so-called small end, which is the end of the connecting rod that is connected to the pivot and actuated with a straight-line motion, and the other end is the solo-called big end, which is the end of the connecting rod that rotates. Due to assembly requirements, the big end of the connecting rod has a detachable portion, known as cap, which is connected to the other big end portion by means of two or more bolts.

In the past, the cap of the big end of the connecting rod was formed by cutting said big end diametrically; this method required subsequent accurate machining to flatten and grind the cutting surfaces in order to ensure perfect mating of the cap with the remaining portion of the big end, which is an indispensable condition for keeping the stresses on the connecting bolts within safety limits.

The cap is currently separated from the big end by controlled parting, which is started from diametrically opposite grooves formed during casting or by mechanical machining on the internal cylindrical surface of the eye of the big end of the connecting rod which couples to the crankshaft.

In this manner, the parting surfaces allow subsequent perfect connection of the cap to the big end of the connecting rod, the consequent elimination of flexural and/or shearing stresses on the connecting bolts, and a significant simplification in the production cycle in general. The methods for parting the cap are essentially based on the concept of applying an axial expansion force to the internal cylindrical surface of the eye of the big end of the connecting rod by means of a diametrically expandable fixture that is capable of transmitting to said surface a parting force the resultant whereof is directed along the axis of symmetry of the connecting rod.

Known procedures for transmitting said parting force are essentially mechanical or hydraulic. A typical mechanically-acting parting procedure, albeit limited to connecting rods produced with pulverized metal forging methods, is disclosed in European patent no. 0 396 797, of May 10, 1989. According to this known procedure, the internal surface of the eye of the big end of the connecting rod is engaged by two oppositely arranged semicylindrical fixtures which are rigidly coupled respectively to a fixed support, to which the connecting rod is also rigidly coupled, and to a sliding support, which receives the impact of a striking mass and transmits it to the internal surface of the eye of the big end of the connecting rod, causing parting of the cap. The condition for correctly parting the cap with such procedures is that the blow transmitted by the striking mass must act so that it is exactly centered on the axis of symmetry of the connecting rod. This entails a highly accurate execution of the machine, an equally accurate positioning of the connecting rod being machined on the fixed support, and a complicated retention system that is adapted to prevent even small rotations of the shank of the connecting rods during the execution of the parting procedure; all these requirements negatively affect the manufacturing and running costs of the machine and keep the efficiency of this known procedure at low levels in terms of parts machined per unit time.

Furthermore, in view of the intensity of the forces involved, this known procedure entails considerable and quick wear of the contact surfaces of the machine parts that are subjected to the parting force, consequently causing loss of the co-planarity of said surfaces and therefore of the indispensable centering of the action of the striking mass with respect to the axis of symmetry of the connecting rods.

Hydraulic-type procedures avoid these drawbacks but do not yield satisfactory results as regards the parting method as to the microcrystalline structure of the parting surfaces.

A typical hydraulic parting procedure is disclosed in U.S. Pat. No. 4,754,906, of Mar. 11, 1987. According to this known procedure, too, the internal surface of the eye of the big end of the connecting rod is engaged by two oppositely arranged semicylindrical fixtures, respectively a fixed one and a movable one, between which the piston of a hydraulic cylinder is interposed; said hydraulic cylinder is adapted to expand the fixtures in a diametrical direction, and a pressure multiplier feeds hydraulic fluid to said cylinder.

The greatest drawback of this known hydraulic parting method is the relatively slow rate at which the pressure of the hydraulic fluid fed into said hydraulic cylinder reaches the value required to part the cap. The material of the cap thus undergoes yielding and elongation, which negatively affect, as mentioned above, both the microcrystalline structure of the parting sections and the geometry of the connecting rod being machined, causing problems in the subsequent assembly of said cap.

SUMMARY OF THE INVENTION

The aim of the present invention is to start from the notion of the above drawbacks of known hydraulic and mechanical parting machines and procedures and eliminate them.

In particular, an important object of the invention is to combine the advantages of mechanical and hydraulic parting procedures, eliminating their respective drawbacks.

In particular, another object of the invention is to provide a parting machine and procedure that on one hand eliminate the requirement, typical of known mechanically-acting machines, of perfectly centering the striking mass with respect to the axis of symmetry of the connecting rod being machined, and on the other hand eliminate the yielding and elongation of the material of the connecting rod that characterize parting procedures performed with known hydraulically-operated machines.

A further important and particular object of the invention is to provide a procedure and a machine for parting the cap of the big end of the connecting rod which are extremely simplified and are capable of ensuring high efficiencies in terms of parts machined per unit time and of reducing machining rejects to negligible values.

Another object of the invention is to provide a parting machine for the specified use that is very compact but highly efficient and reliable in operation and is particularly adapted for being installed in integrated and automated systems for mass-producing connecting rods for motor vehicle engines and the like.

According to the present invention, this aim, these important objects, and others are achieved by providing a procedure and a machine for parting the cap of the big end of connecting rods having the specific characteristics stated in the appended claims.

Substantially, the invention is based on the concept of using a mixed hydraulic and mechanical procedure which consists in engaging the eye of the big end of the connecting rod with two semicylindrical fixtures, respectively a fixed one and a movable one, which are actuated by a hydraulic actuator which is interposed between them and adapted to expand said fixtures in a diametrical direction; in subjecting the piston of the actuator to the action of a hydraulic fluid fed into the respective actuator cylinder at a pre-loading pressure that is lower than the one required to reach the yield point of the material of the connecting rod; and in producing an instantaneous peak in the pressure of the fluid fed to the hydraulic actuator by means of an auxiliary pressure-multiplying piston that is subjected to the momentary action of a striking mass.

The machine that performs the process according to the invention essentially comprises a first fixed semicylindrical fixture, which is supported by a corresponding fixed support that is rigidly coupled to the frame of the machine, which is preferably arranged vertically, and a second movable semi-cylindrical fixture, which is supported by a corresponding movable support that receives and retains the shank and the small end of the connecting rod being machined by means of adapted retention devices and is slideable on vertical guides of said frame. The hydraulic actuator is interposed between the two fixtures and comprises an expansion piston, which is slideable hermetically within a seat of a hydraulic cylinder formed in the body of the fixed fixture and has an active pusher surface that engages, by front surface contact, a corresponding contrast surface of the movable fixture.

A stream of hydraulic fluid at moderate pressure (clamping pressure) is fed into said cylinder seat of the hydraulic actuator by means of a respective feed duct and through a check valve. The feed duct is crossed by a blind cavity into which the rod of a multiplier piston slides hermetically; said piston is hermetically slideable in a corresponding multiplier cylinder and supplies said pre-loading pressure to the hydraulic actuator. A second rod of the piston of said multiplier preferably protrudes out of the respective multiplier cylinder along the axial path of a striking mass which acts on the multiplier piston so as to produce, by means of the penetrating rod of said multiplier, a corresponding pressure peak in the cylinder of the hydraulic actuator and the consequent parting of the cap of the big end of the connecting rod.

The striking mass is preferably subjected to an acceleration means, which can also be used as an element for resetting said mass.

BRIEF DESCRIPTION OF THE DRAWINGS

Further characteristics, purposes, and advantages of the machine and of the process according to the present invention will become apparent from the following detailed description and with reference to the accompanying drawings, given by way of non-limitative example, wherein.

DESCRIPTION OF THE PREFERRED EMBODIMENTS

Figure 1:
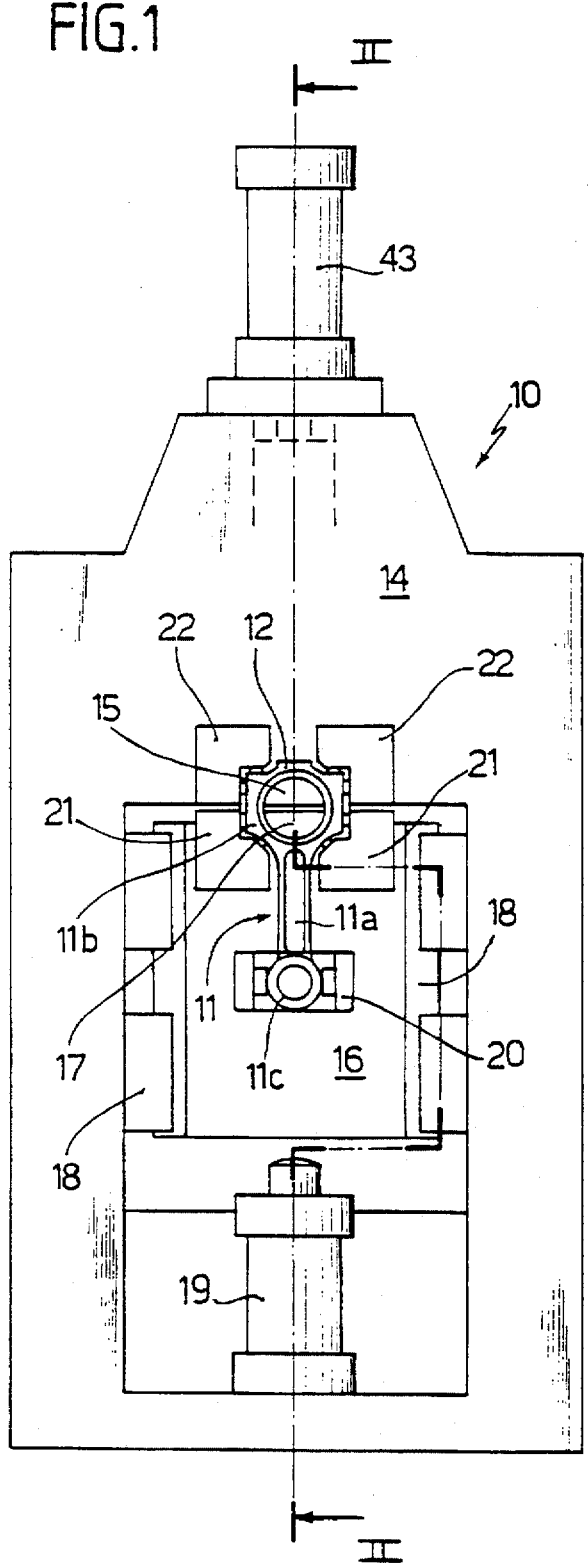
FIG. 1 is a schematic front elevation view of the machine according to the invention in a preferred embodiment.

In the drawings, the reference numeral 10 generally designates the machine, and the reference numeral 11 designates the connecting rod of an internal-combustion engine which comprises a shank 11a, a big end 11b, from which the cap 12 must be broken off, and a small end 11c.

The machine 10 comprises a fixed frame 14, which is preferably vertical and acts as a rigid and fixed support for a corresponding fixed semicylindrical fixture 15, and a movable support 16 for a corresponding movable semicylindrical fixture 17; the fixtures 15 and 17 are juxtaposed at the respective diametrical parting planes, and the movable support is slideable along vertical guides 18, of the type with rollers, which are supported by the frame 14.

A fluid-driven actuator, preferably a hydraulic actuator 19, is provided at the base of the frame 14 to raise the support 16 and place the movable fixture adjacent to the fixed fixture, in order to insert both fixtures in the eye of the big end of the connecting rod 11b when said connecting rod is arranged in the working position on the machine 10.

Figure 2:
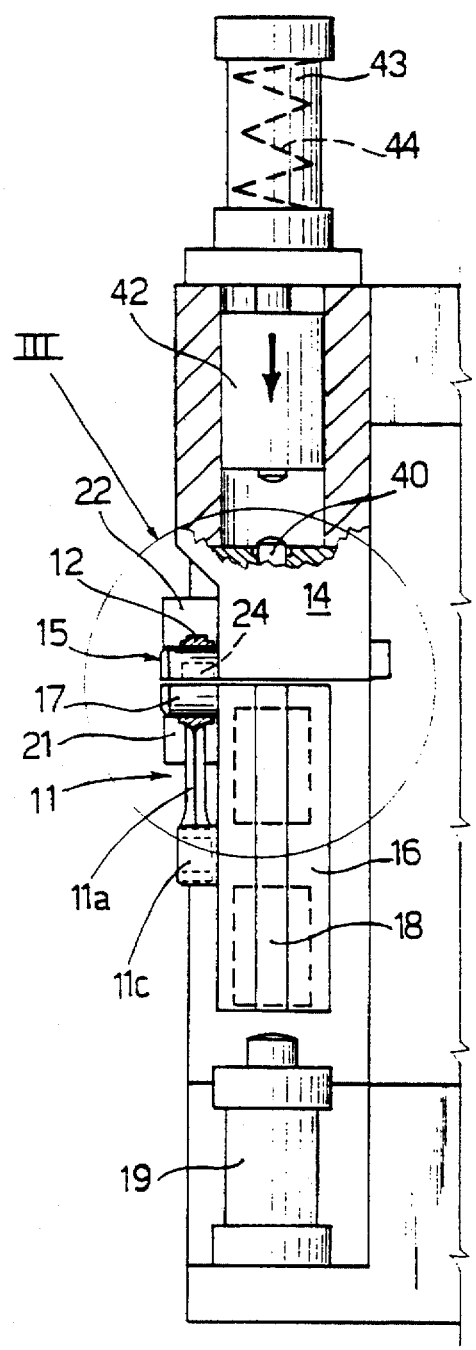
FIG. 2 is a sectional view, taken along the multiple planes II—II of FIG. 1.

As clearly shown in FIGS. 1 and 2, in this working position the shank 11a of the connecting rod 11 lies parallel to the movable support 16 on which there is a first retention device for the small end 11c of the connecting rod, which is constituted for example by lateral supports 20, and there is a second retention device 21 for immobilizing the big end 11b of the connecting rod. A third retention device 22 for immobilizing the big end of the connecting rod is also provided on the fixed frame 14 that constitutes the support of the fixed fixture 15. The retention devices 21 and 22 may be of various kinds, for example constituted by plates provided with clamping pins (not shown) of the threaded type, or clamping rods controlled by actuators, which act along respective retention axes shown in the figure.

A fluid-driven actuator, preferably a hydraulic actuator, generally designated by the reference numeral 24 (FIG. 3), is interposed between the fixed fixture 15 and the movable fixture 17 and is adapted to cause the expansion of said fixtures in a diametrical direction against the inner surface of the eye of the big end 11b of the connecting rod to transmit to said surface a force whose resultant, directed along the axis of symmetry of the connecting rod 11, parts the cap 12.

Figure 4:
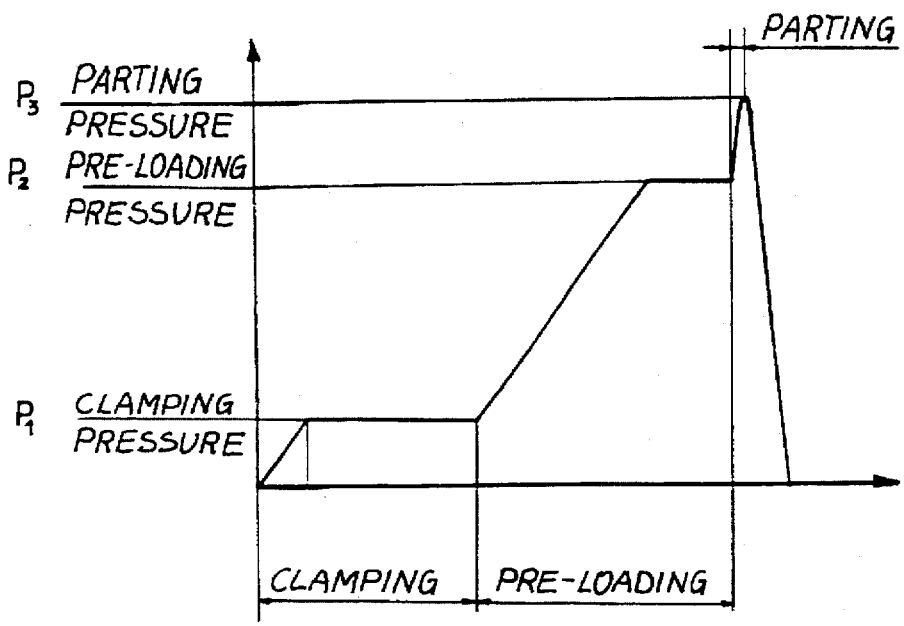
FIG. 4 is a plot of the pressure of the fluid at each individual parting cycle.

In a per se known manner, parting occurs along a parting plane that passes through diametrically opposite initiation grooves provided on the inner surface of the eye of the big end 11b and not shown in the figure. The actuator 24 comprises an expansion piston 25, which is hermetically slideable within a hydraulic cylinder seat 26 formed in the body of the fixed fixture 15 and has an active pusher surface 25a that engages, by front surface contact, a corresponding contrast surface of the movable fixture 17. Said contrast surface is preferably recessed with respect to the diametrical parting plane of the fixture 17 and is surrounded by a hydraulic fluid collection channel 27 which is connected to a drain duct 28 adapted to recover any fluid that may have seeped through the coupling between the piston 25 and the cylinder 26. A stream of hydraulic fluid at moderate pressure which originates from a source of fluid 31 that cooperates with a control element 32 is fed into the cylinder 26 of the actuator by means of a respective feed duct 29 and a check valve 30; said moderate pressure, referenced by P1 in FIG. 4 and termed "clamping pressure", is comprised for example between 20 and 60 bar.

Figure 3:
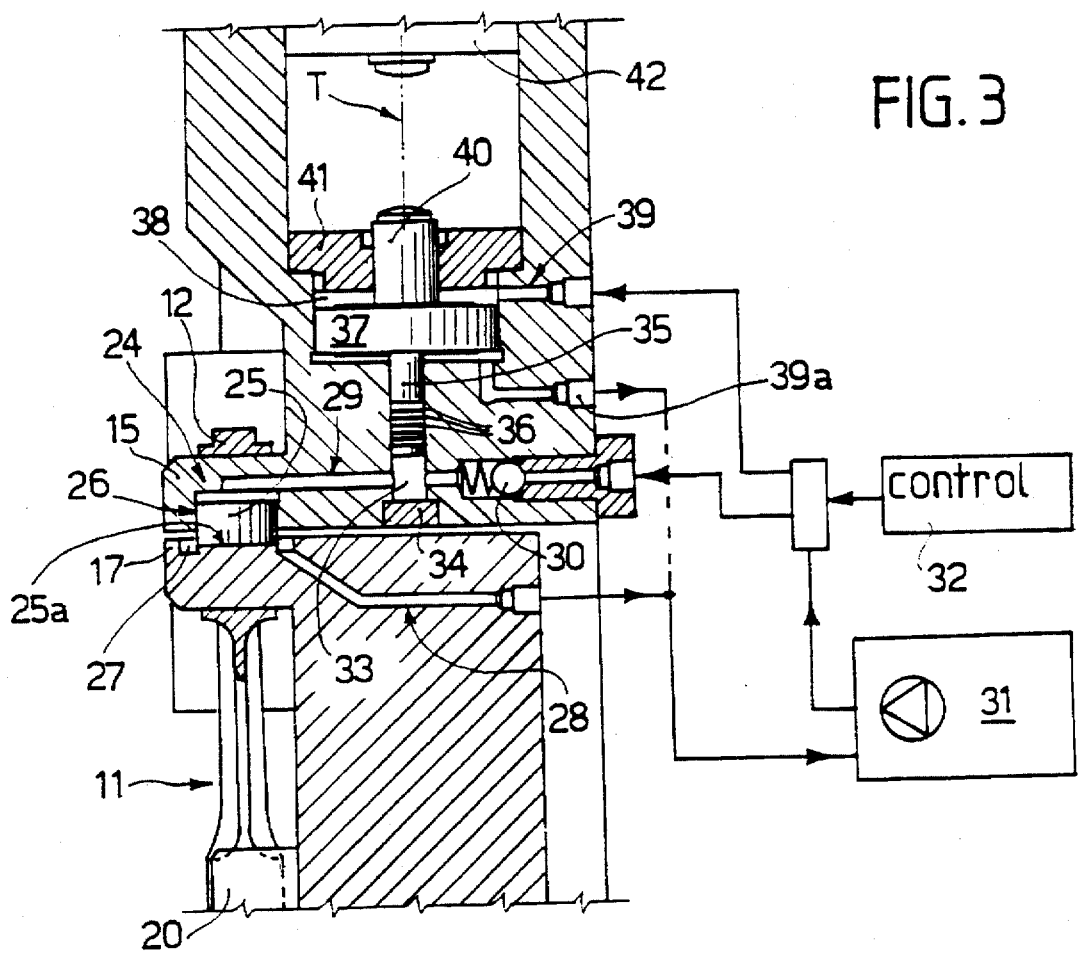
FIG. 3 is an enlarged-scale sectional view, of the detail III of FIG. 1.

As clearly shown in FIG. 3, the feed duct 29 is crossed by a blind cylindrical cavity 33 which is closed by a plug 34. The rod 35 of a multiplier piston 37 enters the cylindrical cavity 33 and is provided with hydraulic sealing means 36; said piston 37 is hermetically slideable within a corresponding multiplier cylinder 38, and the ratio between the diameter of the penetrating rod 35 and the diameter of the multiplier piston 37 is between 1/10 and 1/25. The hydraulic fluid from the source 31 is also fed into the multiplier cylinder 38 by means of a corresponding duct 39, so that the penetrating rod 35, by virtue of the thrust of the multiplier piston 37 and of the presence of the check valve 30 that closes the feed duct 29, raises the pressure of the fluid in the cylinder of the actuator 24 to a pre-loading value P2 (FIG. 4) which produces a force on the piston 25 of the actuator 24 that is in any case lower than the yield point of the metal of the connecting rod 11.

A drain duct 39a is provided on the cylinder 38 to recover any fluid that may have seeped through the coupling between the piston 37 and the cylinder 38. According to the invention, the multiplier piston 37 is furthermore provided with a second rod 40 which hermetically passes through a lid 41 of the multiplier cylinder 38 and protrudes outside said cylinder along the path T along which a striking mass 42 moves axially; said mass is movable along vertical guides of the frame 14 and acts on the penetrating rod 35 by means of the multiplier piston, so as to produce a corresponding momentary pressure peak P3 (FIG. 4) in the cylinder of the actuator 24.

Accordingly, the piston 25 of the actuator 24 discharges a momentary force onto the fixtures 15 and 17; said force is capable of instantaneously parting the cap 12. The momentary nature of the action of the piston 24 on the fixtures 15–17, generated by the impact of the striking mass 42, is such as to avoid the yielding and elongation of the material of the connecting rod 11, and produces parting sections that are particularly adapted for the subsequent connection of the cap 12 to the big end of the connecting rod 11.

Preferably, the striking mass 42 is controlled by an accelerator element 43 which is constituted for example by a hydraulic jack that includes an acceleration spring 44 which can also be used to reset the striking mass 42.

Of course, without altering the concept of the invention, the details of the execution of the process and the embodiments of the machine that performs said process may be altered extensively with respect to what has been described and illustrated by way of non-limitative example without thereby abandoning the scope of the invention as defined by the appended claims.

What is claimed is:

1. A machine for parting a cap of a connecting rod, in particular the cap of an internal combustion engine rod, comprising: a fixed frame which acts as a rigid and fixed support for a corresponding fixed semicylindrical fixture; a movable support for a corresponding movable semicylindrical fixture, said movable support being slideable along guides of said frame, said fixed and movable fixtures being juxtaposable at respective diametrical parting planes to engage an eye of a big end of the connecting rod; a hydraulic actuator which is interposed between said semicylindrical fixtures for causing diametrical expansion thereof in a direction of an axis of a shank of the connecting rod; fluid feeding means for unidirectionally feeding a stream of hydraulic fluid at a clamping pressure to said hydraulic actuator which is interposed between said fixtures; and pressure generating means for producing a momentary pressure peak that are subjected to an action of a striking mass, said striking mass acting on said pressure generating means for producing said momentary pressure peak in said hydraulic actuator and a consequent parting of the cap of the connecting rod.

2. Machine according to claim 1, wherein said fixed and rigid frame of the machine is vertical and said support of the movable semicylindrical fixture is slideable on vertical roller guides supported by said frame.

3. Machine according to claim 1, wherein said movable support is controlled by an actuation means, said actuation means raising said support to allow said fixed and movable fixtures to be mutually adjacent and to allow insertion of both fixtures in the eye of the big end of the connecting rod when said connecting rod is arranged on the machine in working position.

4. Machine according to claim 1, wherein said fixed frame and said movable support comprise retention means for locking the big end and respectively a small end of the connecting rod in working position.

5. Machine according to claim 1, wherein the hydraulic actuator interposed between said fixed and movable semicylindrical fixtures comprises an expansion piston, said expansion piston being hermetically slideable within a hydraulic cylinder seat, said cylinder seat being formed in a body of said fixed fixture, and said expansion piston having an active pusher surface, said pusher surface engaging, by front surface contact, a corresponding contrast surface of the movable fixture.

6. Machine according to claim 5, wherein said contrast surface of said movable fixture is surrounded by a collection channel for seeped hydraulic fluid, said channel being connected to a duct for draining and recycling said seeped fluid.

7. Machine according to claim 1, further comprising a feed duct being provided with a check valve, said feed duct feeding to the hydraulic actuator a stream of hydraulic fluid supplied by said fluid feeding means, said fluid feeding means comprising a source of fluid, said source of fluid providing said clamping pressure which is comprised between 20 and 60 bar.

8. Machine according to claim 7, wherein said feed duct is crossed by a blind cylindrical cavity in which a penetrating rod of a multiplier piston penetrates hermetically, said piston being hermetically slideable within a corresponding multiplier cylinder; said penetrating rod being adapted to produce, upon closing of the feed duct by said check valve, increases in pressure of fluid fed into the actuator, said increases corresponding to hydraulic and mechanical stresses applied to said multiplier piston and respectively transmitted through the rod of said piston.

9. Machine according to claim 8, wherein said multiplier piston constitutes said pressure generating means and comprises a second rod, said second rod protruding outside said multiplier cylinder along an axial path of motion of the striking mass; said striking mass being movable along vertical guides of the frame of the machine and being subjected to an accelerator element, said accelerator element being provided with integrated means for resetting said mass.

* * * * *